United States Patent
Sethi et al.

(10) Patent No.: US 11,184,308 B2
(45) Date of Patent: Nov. 23, 2021

(54) CONFIGURABLE RESPONSE TRACKING AND MONITORING OF USERS WHO ARE RESPONDING TO AN EMAIL

(71) Applicant: Dell Products L. P., Round Rock, TX (US)

(72) Inventors: Parminder Singh Sethi, Ludhiana (IN); Sathish Kumar Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/775,367

(22) Filed: Jan. 29, 2020

(65) Prior Publication Data
US 2021/0234821 A1     Jul. 29, 2021

(51) Int. Cl.
*H04L 12/58* (2006.01)
*H04L 29/08* (2006.01)

(52) U.S. Cl.
CPC .............. *H04L 51/22* (2013.01); *H04L 51/18* (2013.01); *H04L 51/34* (2013.01); *H04L 67/22* (2013.01)

(58) Field of Classification Search
CPC ......... H04L 51/22; H04L 51/34; H04L 67/22; H04L 43/00; H04L 51/00; H04L 51/24; H04L 51/18; G06F 11/34; G06Q 10/10; G06Q 30/00
See application file for complete search history.

(56) References Cited

U.S. PATENT DOCUMENTS

| | | | | |
|---|---|---|---|---|
| 7,870,204 B2* | 1/2011 | LeVasseur | .............. | H04L 51/18 709/206 |
| 8,499,070 B2* | 7/2013 | Roth | ....................... | H04L 43/00 709/224 |
| 2008/0016162 A1* | 1/2008 | Meentzen | ............... | H04L 51/00 709/206 |
| 2009/0157819 A1* | 6/2009 | Hampton | ................ | H04L 67/28 709/206 |
| 2010/0125636 A1* | 5/2010 | Kuhlke | ................. | H04L 51/043 709/206 |
| 2011/0113109 A1* | 5/2011 | LeVasseur | .............. | H04L 51/12 709/206 |
| 2014/0136636 A1* | 5/2014 | Fabre | ................. | G06Q 10/1095 709/206 |

* cited by examiner

*Primary Examiner* — Kostas J Katsikis
(74) *Attorney, Agent, or Firm* — Krishnendu Gupta; Deepika Bhayana; Dorothy Wu Chiang

(57) ABSTRACT

Various systems and methods are provided for using a response tracking plugin to detect and inform users in real time when one or more recipients of an email are actively responding to that email. In one embodiment, the functionality disclosed herein can be applied to an email that was sent to a plurality of recipients, including at least a first and second recipient, and where the email comprises a plugin that is configured to enable response tracking. One such embodiment comprises receiving the email; monitoring for a first pulse from the second recipient of the email, where the pulse is configured to indicate that the second recipient of the email has begun a reply to the email; and in response to receiving the first pulse, displaying an indication that comprises information about the second recipient of the email.

18 Claims, 8 Drawing Sheets

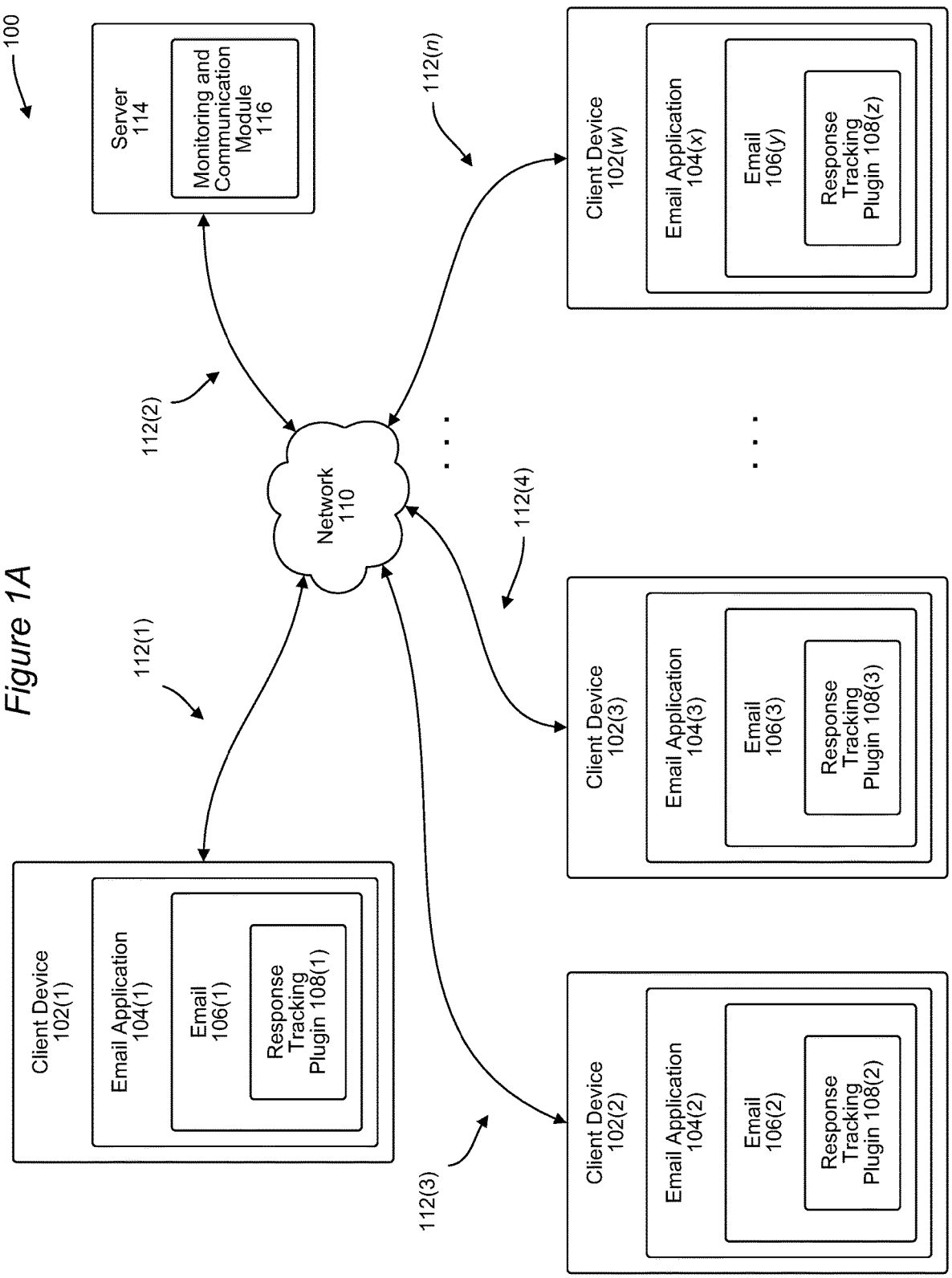

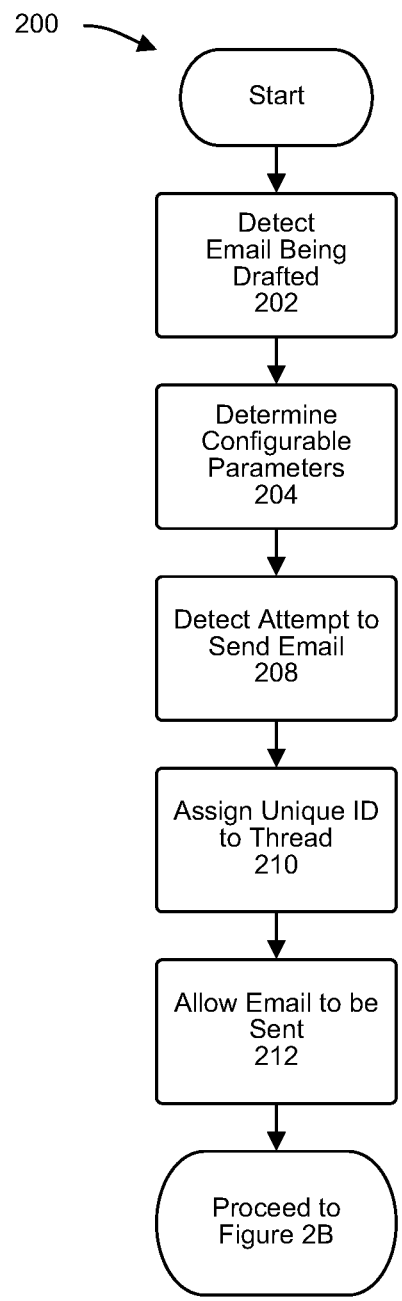

CONFIGURABLE RESPONSE TRACKING AND MONITORING OF USERS WHO ARE RESPONDING TO AN EMAIL

BACKGROUND OF THE INVENTION

Field of the Invention

This invention generally provides functionality for enhanced email functionality, and more specifically provides functionality for informing users in real time when one or more recipients of an email are actively responding to that email.

Description of the Related Art

As business and other communications are increasingly conducted over email, many email threads can generate replies that are inconsistent with each, incoherent, or generally hard to follow within a thread. Moreover, large email threads can lead to undesirably large number of collective responses from the recipients of an email, which can be annoying and even distracting to other uses who were copied on the original email. As a result, productivity suffers, and users may also miss the responses that are actually important if they get overwhelmed and simply stop paying attention to all of the responses coming in. Among other situations, these problems occur when a user sends an email to multiple recipients (especially when the number of recipients is large), and multiple users respond in a short time period because they are unaware as of which other recipients have already begun responding to that email. For instance, in a case where an email comes from an important manager, or where the email appears to be very urgent, many recipients can feel pressured or otherwise sense an immediate need to respond to that email. This behavior can, in turn, create a large number of responses, which leads to problems such as those described above. However, these problems could have been avoided in many situations if many of the users who chose to respond had been alerted to the fact that another user with adequate knowledge and/or authority (e.g., a senior manager, team lead, or anyone else with adequate knowledge or authority) had already begun responding to the email. Therefore, functionality is desirable to alert the sender and recipients of an email when one or more recipients have begun actively replying to that email, and in certain embodiments, who those users are, what title or rank those users hold, and/or the number of users who are currently responding, in addition to other such information that may be relevant and desirable.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

This disclosure generally includes methods, computer program products, computer systems, and the like, that provide for using a response tracking plugin to inform the sender and recipients of an email when one or more recipients are actively replying to the email, including, in certain embodiments, various helpful pieces of information about those respondents, such as their name, title, and/or the number of recipients who are currently responding to the email. As described more fully herein, a response tracking plugin can generate and receive pulses to communicate various information in conjunction with this disclosure. Such a pulse can be thought of as any message or indication that is sent in accordance with the disclosure provided herein, particularly where that message or indication includes metadata and/or other information about the user that is responding to the email, a date time stamp (or other similar information), and information that uniquely identifies the email thread being responded to. Subject to various configuration options that are available to the various users of an email system as described herein, these pulses can be disseminated to the sender and recipients of the email in order to provide them with real time information about the recipient(s) who are actively responding to the email in question, according to the functionality disclosed herein.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 1A is a block diagram depicting an example computing environment, according to one embodiment of this disclosure.

FIG. 2A is a flowchart for performing various steps of a process to draft and send an email that includes the functionality disclosed herein, from the perspective of the drafter and sender of the email, according to one embodiment of this disclosure.

DETAILED DESCRIPTION

Figure 1B:
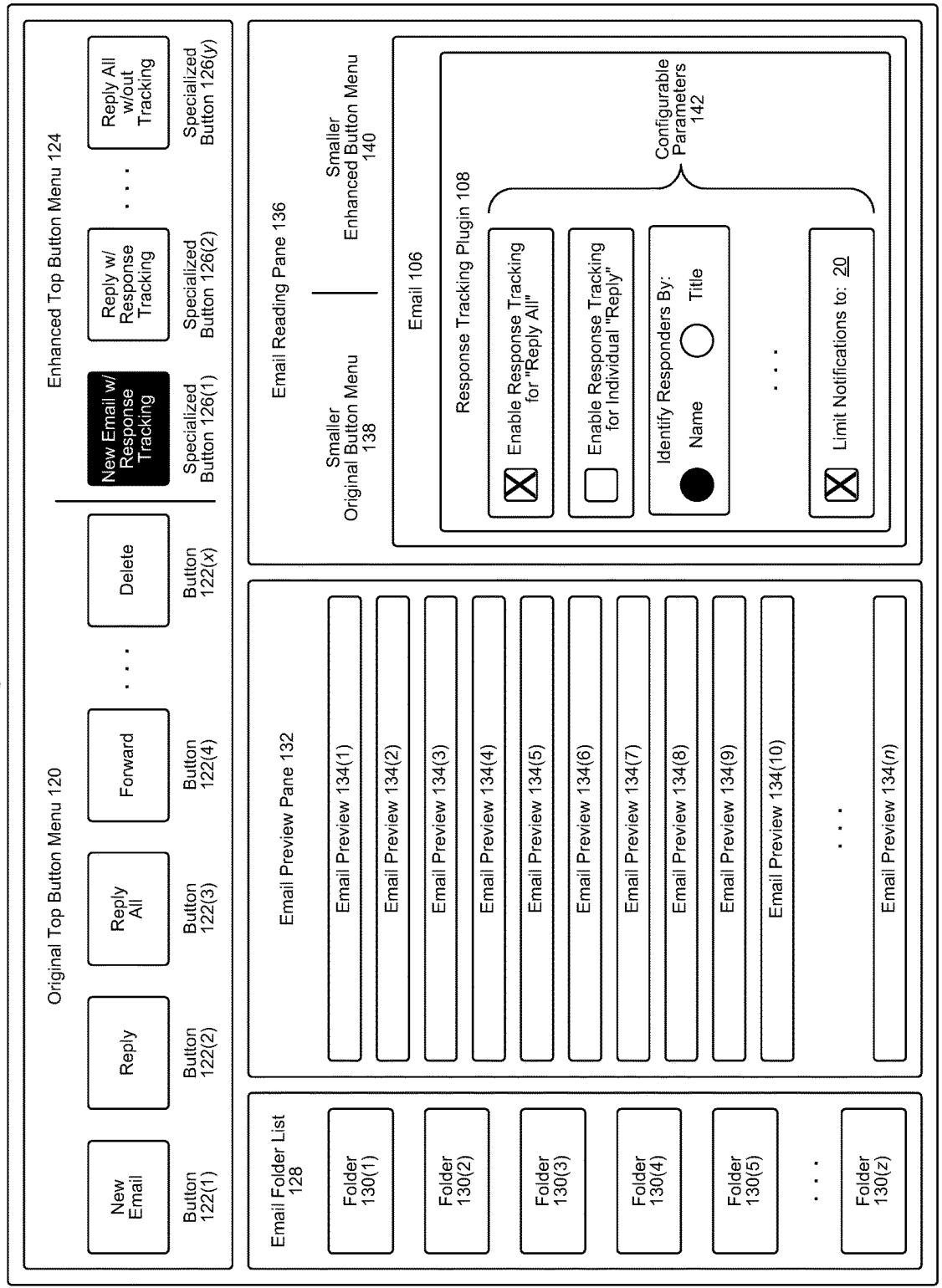
FIG. 1B is a block diagram depicting a user interface of an email application and email that includes the functionality described herein, according to one embodiment of this disclosure.

This disclosure generally includes methods, computer program products, computer systems, and the like, that provide for using a response tracking plugin to inform the sender and recipients of an email when one or more recipients are actively replying to the email, including, in certain embodiments, various helpful pieces of information about those respondents, such as their name, title, and/or the number of recipients who are currently responding to the email. As described more fully herein, a response tracking plugin can generate and receive pulses to communicate various information in conjunction with this disclosure. Such a pulse can be thought of as any message or indication that is sent in accordance with the disclosure provided herein, particularly where that message or indication includes metadata and/or other information about the user that is responding to the email, a date time stamp (or other similar information), and information that uniquely identifies the email thread being responded to. Subject to various configuration options that are available to the various users of an email system as described herein, these pulses can be disseminated to the sender and recipients of the email in order to provide them with real time information about the recipient(s) who are actively responding to the email in question, according to the functionality disclosed herein.

FIG. 1A illustrates a block diagram of an example computing environment 100 that includes a plurality of client devices 102(1)-102(w) (collectively, "client device(s) 102"). Each client device 102 can be any computing device, such as a personal computer, laptop computer, notebook computer, personal computing device (e.g., a smart phone), or any other computing device as described herein. Although not expressly shown in FIG. 1A, each client device 102 can also include various hardware and software components, such as a microprocessor, memory, a display screen, networking capabilities, an operating system, one or more applications, and so forth.

Each client device 102 is also configured to execute an email application, such as, e.g., email applications 104(1)-104(x) (collectively, "email application(s) 104"). Each email application 104 is a computer program, component or module of a computer program (collectively, "computer program"), or another form of computer code (e.g., a webpage) that is configured to send, receive, and read email (among other such functionality), and which can be configured to perform various aspects of the functionality described herein. In certain embodiments, one or more of email applications 104 are enterprise email clients, such as, e.g., MICROSOFT OUTLOOK or another such enterprise email client. In other embodiments, one or more of email applications 104 can be another form of email client, or another form of software (e.g., an Internet browser) that is configured to provide access to an email program (e.g., such as MICROSOFT OUTLOOK EXPRESS, or GMAIL) and/or otherwise perform various aspects of the functionality described herein.

Each email application 104 provides functionality for a user to draft, send, read, and respond to emails, such as emails 106(1)-106(y) (collectively, "email(s) 106"). Each email application 104 can also provide other functionality, including other functionality related to emails (such as, e.g., flagging important emails, filtering emails, and so forth)). Moreover, the reader will appreciate that although only one example email 106 is shown in each email application 104 on each client device 102 depicted in FIG. 1A, in practice, each email application 104 can include zero emails 106, one email 106, or multiple emails 106.

Although not all of the following elements are expressly shown in FIG. 1A, primarily of the sake of space in the illustration, each email 106 is configured to include information identifying a sender; information identifying a recipient list that includes one or more recipients (including, at least potentially, recipients who are copied via the "blind carbon copy," or "BCC," feature of email); a body of the email, which may include text, pictures, and so forth; other data and information that may be included in an email (such as, e.g., attachments, and so forth); and a plugin that can perform various aspects of the functionality disclosed herein, such as, e.g., response tracking plugins 108(1)-108(z) (collectively, "response tracking plugin(s) 108").

In one embodiment, each response tracking plugin 108 can take the form of a software module or other software component that is configured to perform certain aspects of the functionality described herein. As will be discussed in more detail below, examples of such functionality include, e.g., the ability to send pulses (or other signals, messages, indications, and so forth, which will collectively be referred to herein as a "pulse" and grammatical variants thereof) that can be used to determine when a recipient is actively responding to an email, the ability to receive and display information (or other messages, indications, and so forth) about any other users that may be responding to the email thread, and functionality that allows a user to configure various aspects of how the functionality disclosed herein works, such as, e.g., the conditions under which other uses should be notified that someone is actively responding to the email, who receives such notifications, and how such information is displayed to a user, among other such functionality as will be described herein.

As also shown in FIG. 1A, each client device 102 is connected to a network 110 via one of connections 112(1)-112(n) (collectively, "connection(s) 112"). Network 110 can be any sort of network, including a local area network ("LAN"), wide area network ("WAN"), storage area network ("SAN"), the Internet, an intranet, and so forth. Each of the connections 112 can be any sort of wired and/or wireless network connection, such as an Ethernet connection, a Fiber Optic connection, a BLUETOOTH connection, and so forth, including various combinations of the foregoing technologies. Although only one network 110 is depicted in FIG. 1A for the sake of explanation, in practice more or less instances of network 110 can be used.

Moreover, as used throughout this disclosure, the reader will appreciate that the letters n, w, x, y, and z (and other such letters) is/are used to indicate a variable number of devices or components. Although such letters are used in describing a variable number of instances of each of these different devices and components, a repeated use of a given letter (e.g., n) does not necessarily indicate that each device and component has a same number (e.g., n) of instances implemented in the example system discussed herein, or in any other embodiment of this invention.

Through the various connections and networks, each client device 102 shown in FIG. 1A is ultimately connected to a server, such as, e.g., server 114. Server 114 can be any computing device, such as a personal computer, laptop computer, notebook computer, server, or any other computing device that is capable of performing various aspects of the functionality described herein, including, e.g., storing and forwarding emails. Although not expressly shown in FIG. 1A, server 114 can also include other components that are necessary for its functionality, such as a microprocessor, memory, networking capabilities, and so forth. Although only a single server 114 is depicted in FIG. 1A, in practice more than one server can be used, and the components and/or functionality of server 114 can be divided among multiple such servers. In certain embodiments, server 114 is an enterprise email server, or other form of other email server. In other embodiments, server 114 can be any server capable of being configured to perform certain components of the functionality described herein, such as, e.g., one or more steps of FIG. 5 and method 500.

As can be seen from FIG. 1A, server 114 is configured to execute a software module, such as, e.g., Monitoring and Communication Module 116. In certain embodiments, Monitoring and Communication Module 116 is a hardware and/or software module configured to perform various aspects of the functionality described herein. In one embodiment, Monitoring and Communication Module 116 is configured to receive pulses and other information, such as can be sent by a client device 102, email application 104, email 106, and/or response tracking plugin 108; to process information related to those pulses, such as, e.g., determining what email thread the pulse is related to, what user device sent the pulse, a user authority level (e.g., manager, vice-president, and so forth) associated with the user device that sent the pulse, and a time at which the pulse was sent; and to communicate information (such as the aforementioned examples of information mentioned above) to other client devices 102 as appropriate in conjunction with the disclosure provided herein, and which is discussed in more detail elsewhere herein. In other embodiments, Monitoring and Communication Module 116 can perform more, less, and/or other features and functionality as well.

Moreover, although one specific configuration is shown in FIG. 1A, many other configurations of system 100 are possible. For instance, although a certain number of client devices 102 (and their associated components) are depicted in FIG. 1A, in practice this invention can be used with more of less client devices 102. Likewise, more or less networks 110, network connections 112, and servers 114 are possible, and each email application 104 can store and display more than one email 106, including multiple emails 106 that can be open and being processed (by the system and/or by a user) at the same time. Other configurations are possible as well.

FIG. 1B illustrates a block diagram of an example user interface that shows enhanced details of email application 104, an email 106, and a response tracking plugin 108, among other features and functionality. For instance, FIG. 1B shows one view of an email application 104, which includes, starting at the top, an original top button menu 120, which can be any collection of buttons that might standardly be included in an email application, such as, e.g., buttons 122(1)-122(x) (collectively, "buttons 122"). Email application 104 also includes an enhanced top button menu 124, which can be a collection of specialized buttons 126(1)-126(y) (collectively, "specialized buttons 126") that can be added by, or in accordance with, a plugin (or other module), such as, e.g., response tracking plugin 108. As can be seen from the examples provided in FIG. 1B, specialized buttons 126 can add additional features to an email application that would not typically be present as part of the email application's default configuration, but which can be added by response tracking plugin 108 (or similar functionality) to provide enhanced functionality consistent with the disclosure provided herein. For instance, the example specialized buttons 126 that are depicted in FIG. 1B include a "New Email w/Response Tracking" button, a "Reply w/Response Tracking" button, and a "Reply All w/out Response Tracking" button (where w/is shorthand for the character string "with"). In other embodiments, other options are possible as well, such as a "Reply All w/Response Tracking," and a "Reply w/out Response Tracking Button." However, for the sake of space, only certain example options are shown in FIG. 1B. Moreover, as the reader will appreciate, specialized button 126(1) ("New Email w/Response Tracking") is depicted with a black background and white text, to indicate that this button is currently being depressed and/or has been selected. The selection of this specialized button generates a new email with response tracking enabled, as can be seen in the example email 106 and response tracking plugin 108 shown in the bottom right portion of FIG. 1B, and which will be discussed in more detail below.

The example email application 104 shown in FIG. 1B also includes an email folder list 128 near the left of the "screen." Email folder list 128 includes folders 130(1)-130(z) (collectively, "folders 130"), which can be any folders such as are standard in many email programs and which can be used to organized a user's emails by topic, and which can also include subfolders and other functionality.

To the right of email folder list 128 is email preview pane 132, which includes a collection of email previews 134(1)-134(n) (collectively, "email preview(s) 134"), such as are relatively standard in many email applications. As the reader will appreciate, when a user clicks on or otherwise selects an email preview 134 in the email preview pane 132, a more complete version of that email typically appears in email reading pane 136, which is found to the right of email preview pane 132 in FIG. 1B. (In other situations, such as, e.g., when a user double-clicks on an email preview 134 in the email preview pane 132, email application 104 may launch the underlying email in a popup type window, rather than displaying the email in email reading pane 136. Such functionality would still work with the functionality and disclosure provided herein, even though this popup option is not expressly depicted in FIG. 1B.) In other embodiments, such as the one shown here, the email 106 that is shown in email reading pane 136 is a "new" email that was created when a user selected specialized button 126(1) to create a "New Email w/Response Tracking," and which will be discussed in more detail below.

As can be seen in FIG. 1B, and as noted above, email application 104 includes an email reading pane 136 to the right of email preview pane 132. (In practice, many other configurations and layouts are possible, of course.) Email reading pane 136 is generally used to provide enhanced details (such as, e.g., displaying the text and/or body of a received email, or for allowing a user to type in new text when typing out a new email, and/or when forwarding or replying to a previously-received email. As can be seen in FIG. 1B, email reading pane 136 can also include smaller versions of the button menus provided at the top of FIG. 1B, which herein are labeled as a smaller original button menu 138 and a smaller enhanced button menu 140. These smaller button menus can include the exact same buttons that are currently being displayed at any given time in the larger button menus at the top of email application 104, but these smaller button menus can also include a different select and/or reduced number of buttons as compared to the button menus that are displayed near the top of FIG. 1B. In this case, these smaller button menus are only labeled with text (but do not expressly show the buttons themselves), which is done primarily for the sake of space herein.

Email reading pane 136 also includes an email 106, which in this case is a new email with response tracking enabled. At least for this reason, email 106 includes a response tracking plugin 108, which can include configurable parameters such as, e.g., the example configurable parameters 142 that are shown in FIG. 1B. In certain embodiments, these configurable parameters 142 can be displayed directly in the email body (at least until the parameters are set and submitted), or they can be displayed in a popup window hovering above the email body, or they can be set in advance and thus be incorporated into email 106 via response tracking plugin 108 even if they are not directly visible to the user, among other such possible configurations, options, and arrangements. As will be discussed in more detail below in conjunction with FIG. 2A, the example configurable parameters include an option for the drafter of this new email to "Enable Response Tracking for 'Reply All'," which is selected (as shown by the X) in this particular embodiment, and which will enable (and/or require) response tracking to be used any time a recipient of this email chooses to "Reply All" to the email. The example configurable parameters shown in FIG. 1B also include an option for the drafter of this new email to "Enable Response Tracking for Individual 'Reply'," which is not selected (as shown by the empty box to the left of the parameter) in this particular embodiment, but which would enable (and/or require) response tracking to be used any time a recipient of this email chooses to "Reply" to (less than all of the recipients of) this email. The example configurable parameters shown in FIG. 1B also include an option for the drafter of this new email to determine how responders (i.e., users who are actively responding to this email) will be identified in the indications that will be shown, and which will be discussed in more detail below. In the embodiment shown in FIG. 2, the configurable options here are for responders to be identified by "Name" or "Title." The reader will appreciate that the specific embodiment shown in FIG. 1B uses radio buttons to provide for the selection of one of these options, which as the reader will also appreciate, are made mutually-exclusive (i.e., a user can select one, or the other, but not both at once) by the use of "radio buttons." Moreover, the reader will appreciate that the darkened radio button in this parameter indicates that the user has chosen to display the responders by "name" rather than "title" in this particular configuration. The example configurable parameters shown in FIG. 1B also include an option for the drafter of this new email to determine whether to limit the number of indications that can be received in response to this email (which the user has chosen to do here, as shown by the X in the box for this parameter); and when the user has chosen to limit the number of notifications, such as is the case here, the user is also given the option to specify the maximum number of indications that can be received (which value is set to 20 in this embodiment). In practice, many other configurations, options, and arrangements (as well as underlying logic) are possible, some of which will be discussed and/or listed below. The reader will appreciate that the user interface shown in FIG. 1B is provided as an example user interface for one embodiment of this disclosure, and that many other user interface layouts (not to mention configurations, options, and arrangements of each such user interface layout) are possible.

Figure 2B:
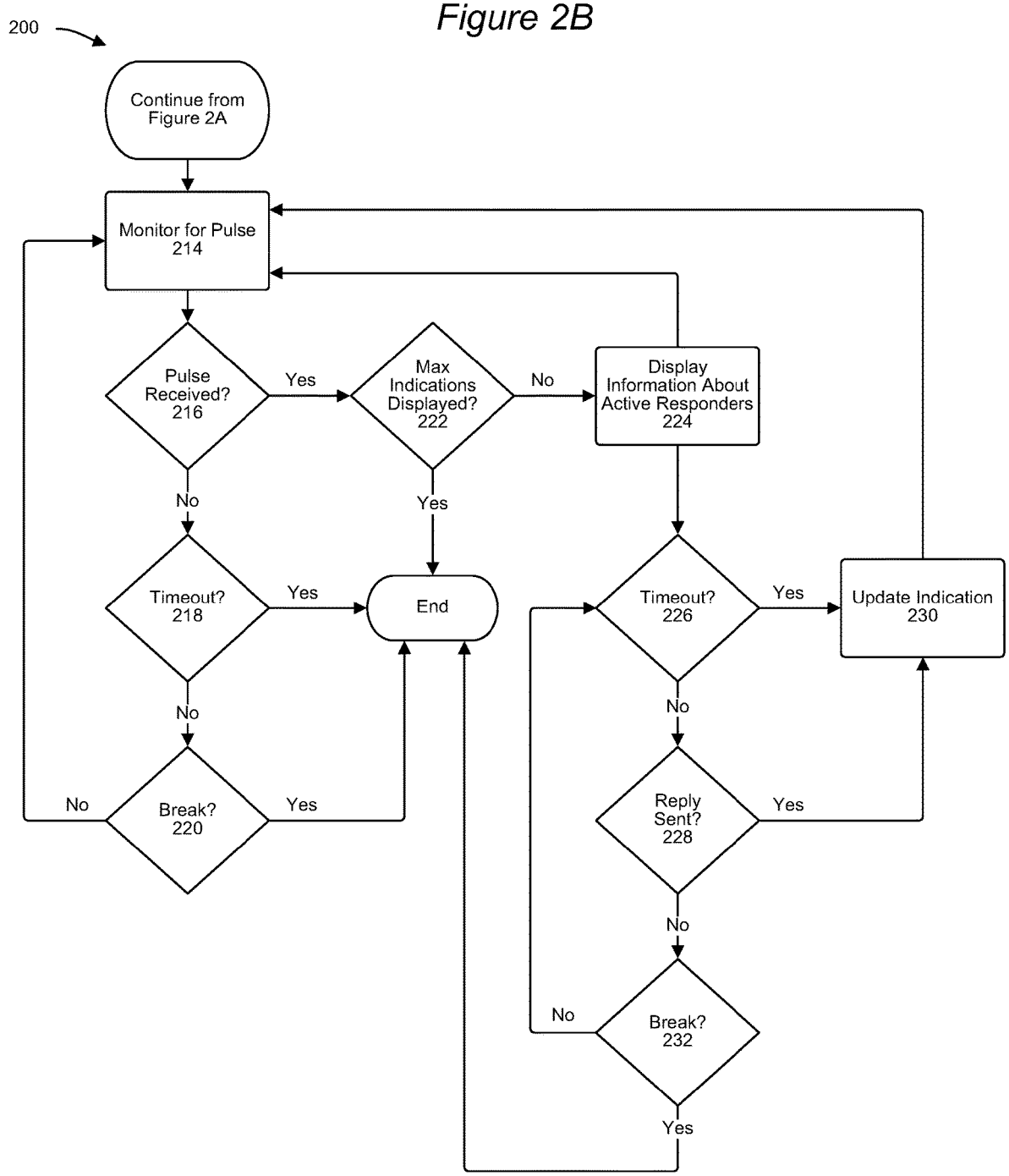
FIG. 2B is a flowchart for performing various steps of a process to monitor other user(s) responding to an email that includes the functionality disclosed herein, from the perspective of the drafter and sender of the email, according to one embodiment of this disclosure.
Figure 3:
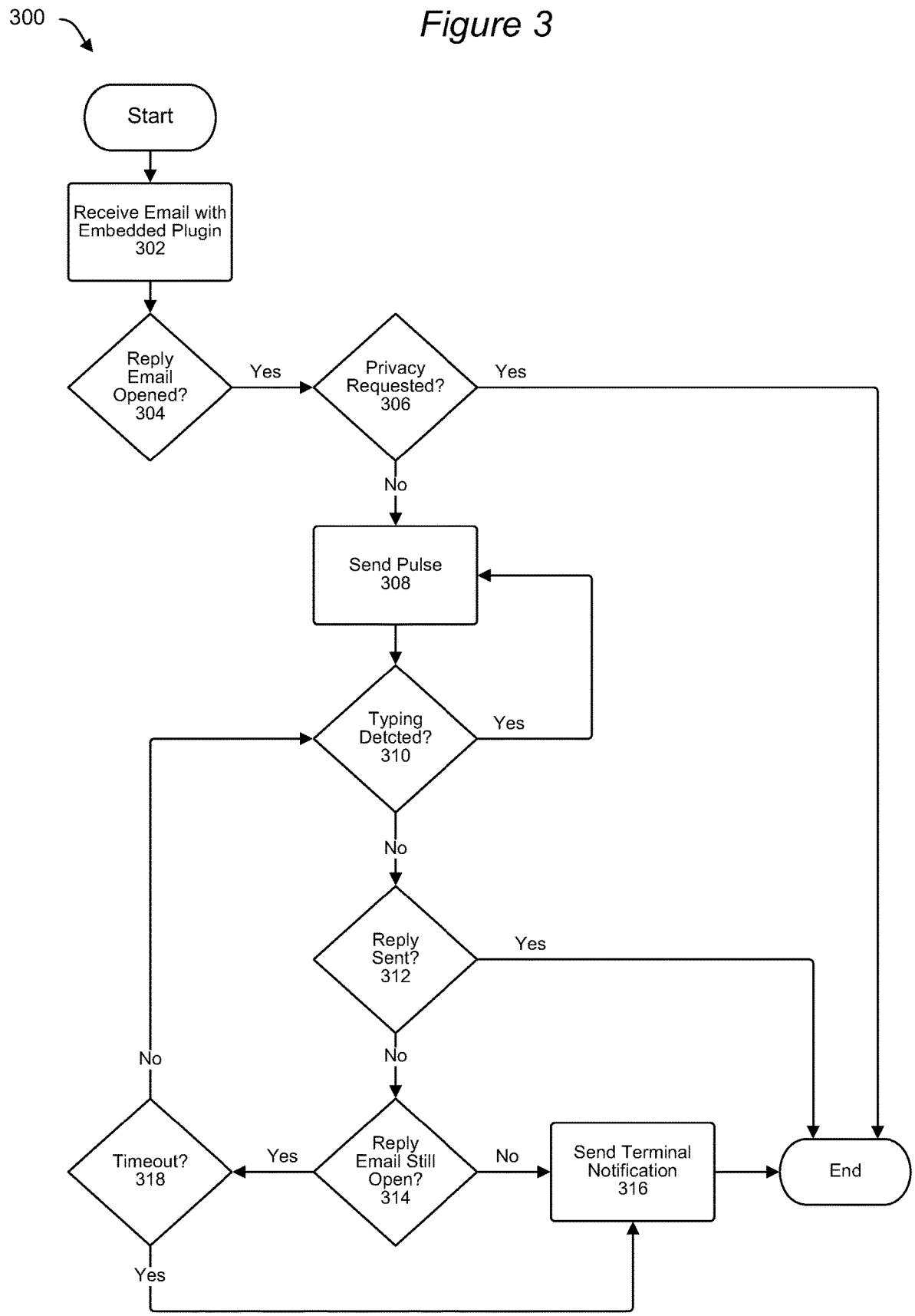
FIG. 3 is a flowchart for performing various steps of a process to monitor user who is responding to an email and to communicate such information to other recipients of the email, from the perspective of a recipient who is responding to the email, according to one embodiment of this disclosure.
Figure 4:
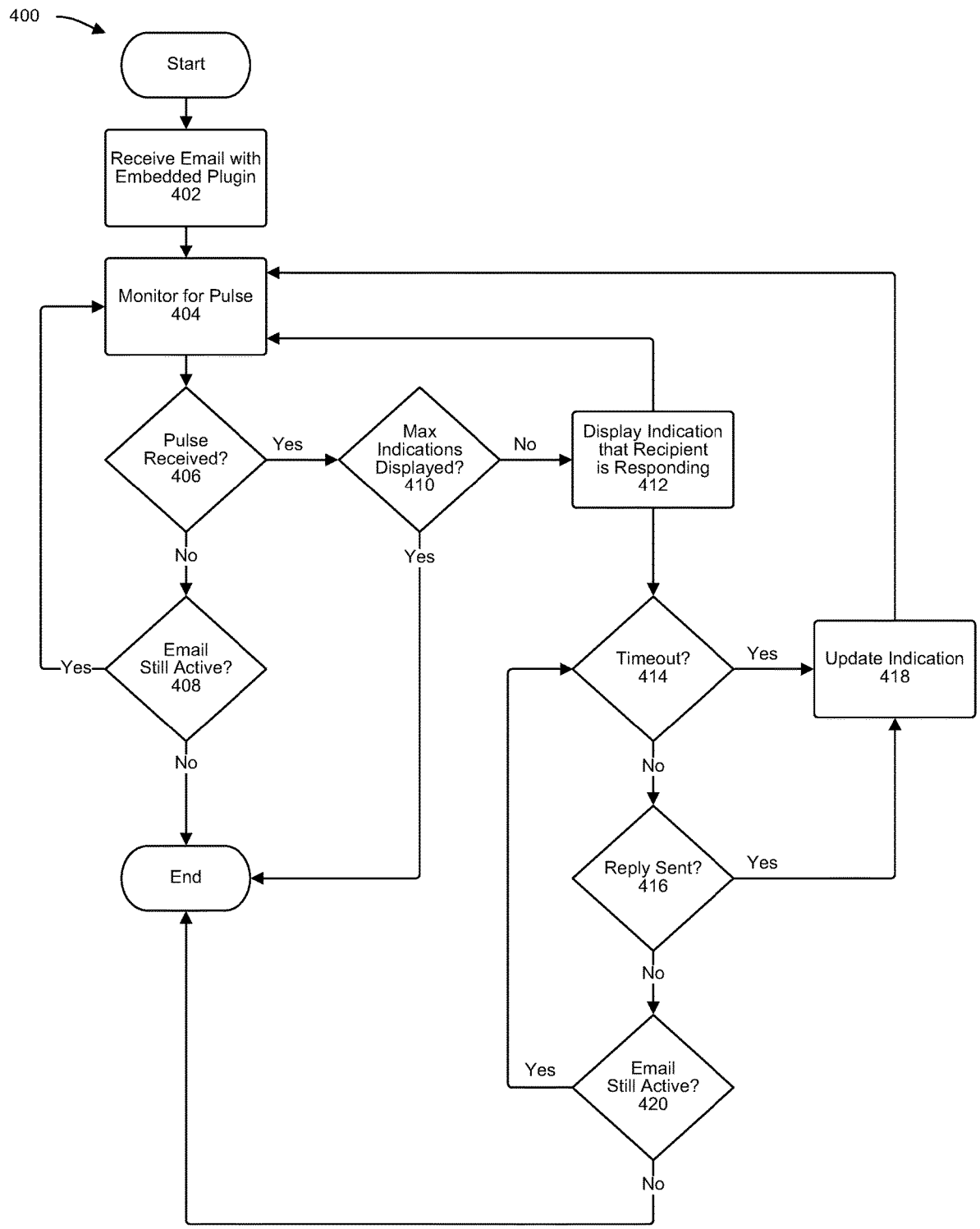
FIG. 4 is a flowchart for performing various steps of a process to receive and display information indicating that another user is responding to an email, from the perspective of a recipient of the email, according to one embodiment of this disclosure.
Figure 5:
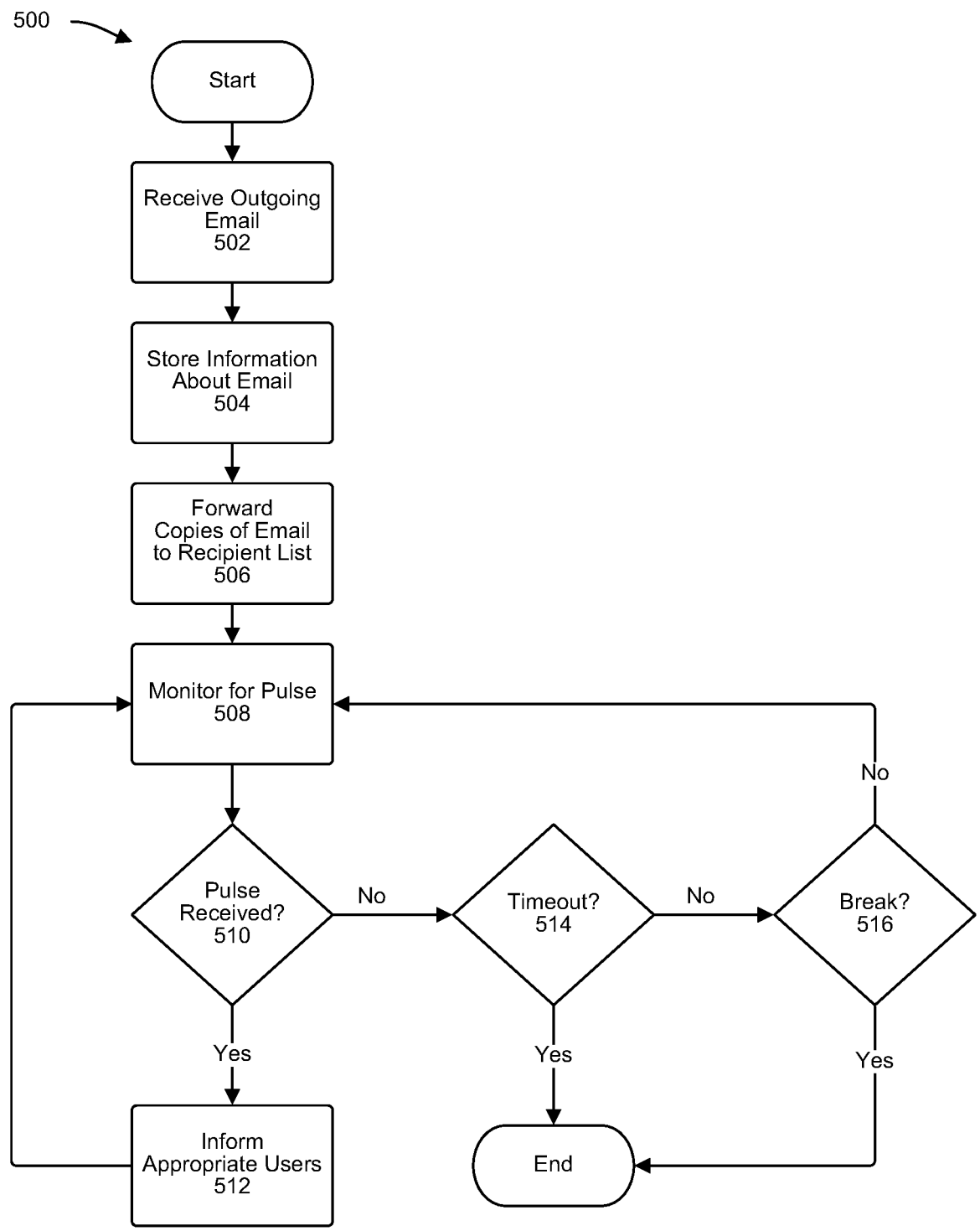
FIG. 5 is a flowchart for performing various steps of a process to monitor, manage, and communicate information indicating which recipient(s) are responding to an email, according to one embodiment of this disclosure.

FIGS. 2A, 2B, 3, 4, and 5 collectively illustrate various actions generally pertaining to the functionality disclosed herein, such as, e.g., configuring and enabling a response tracking plugin 108 on an email that is being drafted, communicating a pulse and other information when a response to a previous email is being drafted, monitoring to remain that a responsive email remains active, monitoring for pulses and/or other information indicating that another user is actively drafting a response to an email, and various functionality performed by a server to monitor and distribute such pulses and other information. In slightly more detail, FIG. 2A and FIG. 2B illustrate various actions that can be performed in conjunction with this disclosure, such as can generally be viewed, e.g., from the perspective of the sender of an email, such as, e.g., the email that begins a new thread. FIG. 3 and FIG. 4, which will be discussed below, illustrate various actions that can be performed in conjunction with this disclosure, such as can generally be viewed, e.g., from the perspective of a user who is responding to an email (or email thread), such as an email that was sent in conjunction with the functionality provided in FIG. 2A, FIG. 2B, and method 200. FIG. 5, which will also be discussed in more detail below, illustrate various actions that can be performed in conjunction with this disclosure, such as can generally be viewed, e.g., from the perspective of a server (such as, e.g., server 114) and/or from the perspective of a SMTP layer. As will also be appreciated in light of the present disclosure, each of these methods may be modified in order to derive alternative embodiments. Moreover, although the steps in the embodiments of these methods that are discussed herein are shown in a sequential order, certain steps may occur in a different order than shown, certain steps may be performed concurrently, certain steps may be combined with other steps, and certain steps may be omitted in another embodiment. For discussion purposes, methods 200, 300, 400, and 500 are described with reference to elements such as those described in connection with FIG. 1A and FIG. 1B, as described above, although other models, frameworks, systems, and environments may be used to implement these processes. In the flow diagram included in each of these figures, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

Turning now to FIG. 2A and FIG. 2B, FIG. 2A and FIG. 2B are flowcharts of portions of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIG. 1A and FIG. 1B. In the flow diagrams of FIG. 2A and FIG. 2B, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 200 is described with reference to FIG. 1A and FIG.

1B as described above, although other models, frameworks, systems and environments may be used to implement these processes.

To provide more detail, FIG. 2A and FIG. 2B are flowcharts of portions of a process 200 that illustrates various actions that can be performed in conjunction with this disclosure, such as can generally be viewed, e.g., from the perspective of the sender of an email, such as, e.g., the email that begins a new thread, according to some embodiments. The process 200 may be performed by a computing device (such as, e.g., any client device 102) as described herein, and process 200 may also be performed in conjunction with one or more steps of one or more other processes described herein, such as methods 300, 400, and 500.

In one embodiment, method 200 begins at 202, where method 200 detects that an email is being drafted, and more specifically, that an email is being drafted that includes the necessary plugin (such as, e.g., response tracking plugin 108) and/or other software that is capable of performing one or more steps of method 200. In certain embodiments, this email should preferably be a "new" email in the sense of starting a new email thread, or at least a new email topic, as opposed to being a "reply" to a previous email. In other embodiments, however, this email can be any email that is being drafted, so long as the email is configured with the necessary plugin and/or other software that is capable of performing one or more steps of method 200.

At 204, method 200 determines (and/or receives and/or detects) one or more configurable parameters, such as, e.g., one or more of the example configurable parameters 142 shown in FIG. 1B, in addition to many other such possible configurable parameters. For instance, during the process of drafting an email (such as, e.g., the email that was detected as being drafted in 202), the email drafter (who will eventually become the email sender) can enable certain flags and/or otherwise set certain parameters (collectively, "set parameters" and grammatical variants thereof) with respect to that email and the ensuing responses thereto. For example, the email drafter can set a parameter that allows the recipients of the email to inform him or her when a recipient performs certain actions, such as when a user clicks (or otherwise selects) the "Reply" option and/or the "Reply All" option, or only when a user clicks (or otherwise selects) the "Reply All" option but not for the "Reply" option, and/or when the user begins typing the response. (One reason for this distinction is that a user who has chosen to only "Reply" back to the sender (but not to "Reply All" to all of the recipients in the email thread) may desire privacy and/or may not want other recipients to know that s/he is responding.) In certain embodiments, the plugin can be configured to send a first pulse when a recipient clicks Reply and/or Replay All, as appropriate, and to send a second pulse when the recipient begins typing the response, and to perhaps send one or more subsequent pulses if the recipient resumes typing the response after having taken a break of a certain length of time, which length of time can also be configured either as a default parameter (such as, e.g., by an administrator) and/or by the email drafter.

As another example, the email drafter can set a parameter that determines what information is conveyed to other recipients when one (or more) of the recipients begin replying to the email. For instance, one configurable option of this parameter will inform the other recipients which specific user(s) (e.g., Bob Smith) are currently responding to the email. Another configurable option of this parameter will inform the other recipients how many other user(s) (e.g., 1, 2, etc.) are currently responding to the email, but will not inform the other recipients as to which specific user(s) (e.g., Bob Smith) is currently responding to the email. Another configurable option of this parameter will inform the other recipients of the "highest ranking" or "most important" user that is currently responding to this email (e.g., a vice-president or senior manager, among many other such possibilities), and if more than one user is currently responding, provide an indication as to the number of other users that are currently responding (e.g., assuming that Bob Jones is a senior manager and the highest ranking person currently responding to the email, the indication may say "Bob Jones and 3 other users are currently responding," or "A Senior Manager and 3 other users are currently responding," among other such options). In certain embodiments, any specific names that are listed can be color-coded to indicate the level of importance of that user (e.g., vice-presidents can be coded orange, senior managers coded blue, managers coded green, and so forth). Another configurable option of this parameter will set an upper limit to how many notifications should be sent (from the respondents, collectively) and distributed (to the original send and to other respondents), which can be used to limit network traffic particularly on emails with large distribution/recipient lists. Other configurable options are possible with respect to this parameter as well.

In certain embodiments, one or more configurable parameters can be determined by the drafter of the email while s/he is drafting that email. One or more configurable parameters can also be set by default, or determined in advance by an administrator. In certain embodiments, particularly where the specific configurable parameters are set by default and/or determined in advance by an administrator, the drafter of the email may nevertheless be given the option to turn the entire plugin module "on" or "off" with respect to any given email.

At 208, method 200 detects (or otherwise determines) that an attempt by a user to send the email, such as pressing the "Send" button in an email window or pressing a keyboard shortcut configured to send an email. At 210, method 200 assigns a unique ID to the thread (or determines a unique ID that was previously assigned to the thread), such as, e.g., inserting metadata containing a unique ID into the plugin. At 212, method 200 allows the email to be sent. In other embodiments, method 200 can add the unique ID to the plugin and/or to thread at a different time during the process, and/or in a different manner. For instance, method 200 can determine, assign, and/or embed the unique ID as soon as the email is open for drafting, or as soon as the drafter of the email enables the plugin to be used in the particular email being processed here. After 212, method 200 continues to the portion of method 200 that is shown in FIG. 2B, beginning with 214, to monitor for responses that are actively being typed.

At 214, method 200 begins monitoring for a pulse (or another indication or relevant information) to be received from any of the recipients of this email. At 216, method 200 determines whether a pulse (or another indication or relevant information) was received. If 216 determines that a pulse (or another indication or relevant information) was not received, method 200 proceeds to 218 and determines if a timeout (or any other indication that method 200 can stop monitoring for a pulse or another indication or relevant information related to this particular email thread) has occurred (or otherwise been received). If 218 determines that a timeout (or another indication that method 200 can stop monitoring for a pulse or another indication or relevant information related to this particular email thread) has occurred (or otherwise been received), method 200 ends. If 218 determines that a timeout (or another indication that method 200 can stop monitoring for a pulse or another indication or relevant information related to this particular email thread) has not occurred (or otherwise been received), method 200 determines if there any other reason to "break" at 220. For instance, in certain embodiments, method 200 may break if method 200 determines that the email is not still active, such as, e.g., for the reasons provided in step 408 and discussed in conjunction with that step below. In other embodiments, method 200 may break for another reason, including receiving an indication from the sender of the email that s/he no longer wishes to actively monitor for responsive emails, and/or the sender of the email powering down his or her client device 102. If method 200 determines to break at 220, then method 200 ends. If method 200 fails to identify or otherwise determine any reason to break at 220, method 200 returns to 214 and continues to monitor for a pulse.

If 216 determines that a pulse (or another indication or relevant information) was received, method 200 proceeds to 222 and determines whether the maximum number of indications for the email have already been displayed. For instance, a user may configure his or her system to only display the first n number of indications that are received for any given email, in order to avoid the user being overwhelmed with an excessive number of indications, popup notifications, bubbles, and so forth. In certain embodiments, this skip may either be skipped entirely, and/or configured so that no maximum number of indications exist (so that all indications are displayed, even if the number of indications displayed becomes large). In certain embodiments, such as the one shown in FIG. 2A and FIG. 2B, if method 200 determines at 222 that the maximum number of indications for the email have already been displayed, then there is no further need to monitor for further pulses or display further indications, and method 200 ends. If method 200 determines at 222 that the maximum number of indications for the email have not already been displayed, and/or if 222 is skipped entirely in a given embodiment, method 200 proceeds to 224. (Although not expressly shown in FIG. 2A and FIG. 2B, in certain embodiments method 200 can also determine, prior to performing 224, whether a user has elected to "suppress" or otherwise block notifications. If method 200 determines that a user has chosen to suppress or otherwise block notifications, method 200 can end at this point.)

At 224, method 200 displays (or updates previously displayed) information about one or more active responders. From the perspective of method 200, this information is displayed to the user who sent the email being monitored by method 200. (Other methods will display information to the recipients of this email, as appropriate.) In certain embodiments, the specific information displayed (or updated) at this point is based on the parameters that were configured and determined in 204. For instance, and depending on how the parameters were set above, method 200 may display messages such as, e.g., "Bob Smith is responding," or "Two users are currently responding," or "Bob Smith and two other users are currently responding," or "A Senior Manager and two other users are currently responding," in addition to many other specific phrasings that can be used. In certain embodiments, this information can be displayed via a popup "notification" or "bubble." Particularly when popup notifications and/or bubbles are used to display such information, the system can be configured to only display a limited number of such popups, or to only display a new popup when material information has changed (such as, e.g., when a higher ranking user begins responding, but perhaps not to notify of a less important change such as going from three users responding to four users responding). In other embodiments, this information can be displayed in a manner other than a popup notification or bubble (which typically appear for a brief period of time, and then fade away from view on the screen), such as by a permanent monitor (such as, e.g., a JAVA APPLET, among many other such options) that remains on the sender's screen (rather than fading away) as long as method 200 is active for a particular email. In such an embodiment, the monitor component can provide unlimited real-time updates about which and how many users are responding without burdening the sender with the annoyance of repeated popup notifications and/or bubbles. (Updated information can also be provided in other embodiments as well, including, e.g., when popup notifications and/or bubbles are used, among other options.)

Because this is an interactive process that does not necessarily end after the first pulse (or other indication or relevant information) was received, after the relevant information is displayed in 224, method 200 can simultaneously perform two sets of actions in parallel (or substantially in parallel), as shown by FIG. 2B.

In one set of actions, method 200 can return to 214 and continue monitoring for another pulse, such as, e.g., a pulse indicating that an additional user has begun responding, as well as an additional pulse indicating that a user who had previously begun responding is still actively responding. This thread is seen by the arrow protruding upwards from 224, and connecting back to 214.

In another set of actions, which can generally be seen by the arrow extending downwards from 224, method 200 can perform 226 and 228 in order to determine if the information in the indication that was displayed in 224 has gone stale for any reason, in which case the indication may have to be updated to reflect the fact that this particular user is no longer responding. For instance, at 226, method 200 determines whether a timeout has occurred, e.g., whether a sufficient amount of time has elapsed without receiving any further indication that the user who generated the pulse (that was received in 216) is still actively responding, in which case the method can assume that this user is no longer actively replying, and that the indication that was displayed in 224 has to be updated accordingly (or that this information has to be reflected in a subsequent indication). At 228, method 200 determines whether the reply (for which the pulse was received in 216) has been sent, i.e., the user who generated the pulse is no longer actively responding because s/he has completed and sent his/her response, in which case the indication that was displayed in 224 also has to be updated accordingly (or that this information has to be reflected in a subsequent indication).

If either 226 and/or 228 evaluate in the affirmative, method 200 proceeds to 230 and updates the indication that was issued in 224 (or issues a new update that reflects the updated information, or alternatively, stores the information for use in a subsequent update that is issued at a future time). For instance, method 200 can remove the name of the user who stopped responding if his or her name was previously listed in the indication, and/or decrease the count of the number of users that are actively responding, among other such examples. Method 200 then proceeds back to 214, and continues to monitor for a further pulse (or other indications or relevant information) to be received (either from the same user or client device 102 from which the most recent pulse was received in 216, or from a different user or client device 102).

If both 226 and 228 evaluate in the negative, method 200 (and/or the thread, subthread, process, subprocess, etc., that is performing steps 226, 228, and 230) determines if there any reason to "break" out of this loop at 232. For instance, in certain embodiments, method 200 may break out of this loop if method 200 determines that the email is not still active, such as, e.g., for the reasons provided in step 408 and discussed in conjunction with that step below. In other embodiments, method 200 may break out of this loop for another reason, including receiving an indication from the sender of the email that s/he no longer wishes to actively monitor for responsive emails, and/or the sender of the email powering down his or her client device 102. If method 200 determines to break at 232, then method 200 ends. If method 200 fails to identify or otherwise determine any reason to break at 232, method 200 returns to 226 and continues to loop through 226 and 228 until either 226 and/or 228 evaluate in the negative (in which case the method proceeds to 230 and then back to 214); or until method 200 identifies or otherwise determines a reason to break at 232, in which case method 200 ends.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIG. 1A and FIG. 1B. In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIG. 1A and FIG. 1B as described above, although other models, frameworks, systems and environments may be used to implement these processes.

To provide more detail, FIG. 3 is a flowchart of a process 300 that includes various actions that can be performed to inform other users when a recipient of an email has begun responding and/or continues to actively respond to that email, such as can generally be viewed, e.g., from the perspective of the recipient of an email that includes a response tracking plugin 108 and/or which is otherwise configured to perform one or more steps of the functionality described herein, according to some embodiments. (FIG. 4 and the associated method 400, which will be discussed below, cover the process of one recipient's machine monitoring for other recipients to begin, and continue, responding to the email.) The process 300 may be performed by a computing device (such as, e.g., any client device 102) as described herein, and process 300 may also be performed in conjunction with one or more steps of one or more other processes described herein, such as methods 200, 400, and 500.

In one embodiment, method 300 begins at 302, where an email that includes an embedded plugin that is configured to perform functionality in accordance with this disclosure (such as, e.g., a response tracking plugin 108) is received. At 304, method 300 determines that a Reply and/or Reply All (depending on the specific configurations set elsewhere) email was opened (i.e., in response to the email received in 302). Such an email can be opened, e.g., by a user clicking on (and/or pressing a keyboard shortcut associated with) the "Reply" or "Reply All" button (depending on the specific configuration of the parameters associated with this particular email). As noted above, the original sender of this email (e.g., the sender who began the email thread that is being responded to here, and/or the sender who sent the most immediate response in the email thread that is being responded to here) can configure a parameter to indicate whether a pulse should be generated when a user clicks (or otherwise selects) the "Reply" option and/or the "Reply All" option, or only when a user clicks (or otherwise selects) the "Reply All" option but not for the "Reply" option. (As noted above, one reason for this distinction is that a user who has chosen to only "Reply" back to the sender (but not to "Reply All" to all of the recipients in the email thread) may desire privacy and/or may not want other recipients to know that s/he is responding.)

In certain embodiments and regardless of the parameters entered by the original sender, a recipient may desire to suppress any pulses (or other notifications) indicating that s/he is responding, particularly if s/he is replying to less than all of the users in the original recipient list. Similar to the distinction noted above about Reply vs. Reply All, one reason for this functionality is that a user may desire privacy and/or may not want other recipients to know that s/he is responding, particularly when s/he is responding to less than all of recipients of the email to which s/he is responding. This determination can be made in 306, where method 300 determines whether the responding user has requested privacy and/or otherwise does not wish for other users to be notified that s/he is responding. In certain embodiments, this determination can be made based, at least in part, on predetermined parameters (or settings, etc.) that were configured by the user prior to beginning his or her reply here. For instance, a user may set a setting on his or her computer indicating that s/he always desires privacy (i.e., does not want a pulse or any other indication sent) in certain situations, such as, e.g., when the user clicks (or otherwise selects) "Reply" (as opposed to "Reply All"), when certain recipients are (or are not) in the recipient list that is being responded to, or perhaps even in any situation (including when the user clicks (or otherwise selects) "Reply All"). In other embodiments, a user may make this determination after click on (or otherwise selecting) "Reply" or "Reply All," such as, e.g., by responding to a popup asking whether the user would like to inform other recipients of the original email that s/he is responding. In other embodiments, the plugin 108 (or some other component of the email) may display (or cause to be displayed) additional buttons to the user, such as, e.g., a "Reply All Without Notification" and/or a "Reply with Privacy" button. In other embodiments, this option may be provided to the recipient (who is now responding) in a different manner. Moreover, although 304 and 306 are shown as distinct steps in FIG. 3, in practice these two logical steps may be combined into a single activity. Furthermore, in certain embodiments such as some of those discussed above, the privacy determination of 306 can be made before (or in conjunction with) the determination of 304, in order to avoid the pulse being sent before the user has the opportunity to determine if s/he wants his/her response to be private. In any event, if 306 determines that privacy has been requested for this particular response, method 300 ends.

If 306 determines that privacy has not been requested for this particular response, method 300 proceeds to 308 and sends an outgoing pulse (or other notification and/or information) indicating that a recipient has opened a responsive email (e.g., a Reply or a Reply All). (An outgoing pulse is simply a pulse that is sent out from a client device or other component of system 100, as opposed to a pulse that has been received by a client device or other component of system 100.) In certain embodiments, this pulse (or other notification and/or information) includes various identifying information, and in certain embodiments will include at least information identifying the user who is drafting the response (e.g., the user's username, title or role, real name, and/or other identifying information) and information identifying the email and/or email thread to which the response pertains (e.g., a Unique ID associated with the email and/or email thread, or other information that uniquely identifies the email and/or email thread). In various embodiments, this pulse (or other notification and/or information) can be sent to an enterprise email server (or other email server), such as server 114, which can then distribute the pulse (or other notification and/or information) to the client device 102 that originally sent the email that is now being responded to and to the other client devices 102 that received the email that is now being responded to, which functionality will be discussed in more detail below in conjunction with FIG. 5 and method 500. In other embodiments, this pulse (or other notification and/or information) can be sent directly to the client device 102 that originally sent the email that is now being responded to and to the other client devices 102 that received the email that is now being responded to.

At 310, method 300 determines whether any typing has been detected since the previous pulse was sent, such as, e.g., typing in the body of the email. As the reader will be appreciate, typing in the body of the email (or similar activities) indicates that the response is still active, and that the user has not "walked away" or otherwise abandoned the response. If typing is detected in 308, then method 300 proceeds to 308 and sends another pulse (or other notification and/or information), which server 114 and/or other client devices 102 can use to determine that the reply associated with this particular user is still active. Although not expressly shown in FIG. 3, in certain embodiments this second pulse (and any subsequent pulses that are sent in response to detecting typing in 310) will only be sent if a certain amount of time (e.g., one second, five seconds, ten seconds, or any other amount of time as configured by the system and/or users thereof) has elapsed since the previous pulse was sent, which can be done in order to avoid overwhelming the system with a flood of pulses when a user is actively typing a response.

If 310 does not detect any typing, or if the typing has stopped, method 300 proceeds to 312 to determine if the reply has been sent. If the reply has been sent, method 300 ends, as no further monitoring is needed at this time. If 312 determines that the email has not yet been sent, then method 300 proceeds to 314 and determines whether the email is still open (or, e.g., whether the email has been closed out by the user, the user's system has crashed, or whether the email is no longer open for any other reason). If 314 determines that the reply email is not still open, method 300 proceeds to 316 and sends a terminal notification. This terminal notification is sent in the same general manner (and to the same recipient devices) in which the pulse was sent, although this terminal notification should include information indicating that the user has ceased replying to the email. Method 300 then ends.

If 314 determines that the reply email is still open, method 300 proceeds to 318 and determines whether a timeout has occurred, e.g., whether a certain amount of time (e.g., 30 seconds or one minute, among many other possible options) has occurred with any (further) activity by the user. If 318 determines that a timeout has occurred, method 300 proceeds to 316 and sends a terminal notification as described above, and method 300 then ends. If 318 determines that a timeout has not occurred, method 300 returns to 310 and continues to monitor to determine whether any typing has occurred.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIG. 1A and FIG. 1B. In the flow diagram of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIG. 1A and FIG. 1B as described above, although other models, frameworks, systems and environments may be used to implement these processes.

To provide more detail, FIG. 4 is a flowchart of a process 400 that includes various actions that can be performed to monitor for other recipients to begin, and continue, responding to an email, such as can generally be viewed, e.g., from the perspective of the recipient of an email that includes a response tracking plugin 108 and/or which is otherwise configured to perform one or more steps of the functionality described herein, according to some embodiments. The process 400 may be performed by a computing device (such as, e.g., any client device 102) as described herein, and process 400 may also be performed in conjunction with one or more steps of one or more other processes described herein, such as methods 200, 300, and 500.

In one embodiment, method 400 begins at 402, with the receipt of an email that includes an embedded plugin that is configured to perform functionality in accordance with this disclosure (such as, e.g., a response tracking plugin 108). At 404, method 400 begins monitoring for a pulse (or other notification and/or information) to be received from a server (such as, e.g., server 114) and/or from one or more client devices 102, where such a pulse was sent in conjunction with the email that was received at 402. For instance, the pulse (or other notification and/or information) may be configured to include information uniquely identifying the email and/or email thread, such as, e.g., a Unique ID associated with the email and/or email thread. Of course, the pulse (or other notification and/or information) may include other information as well, such as information identifying the user account that is currently typing a responsive email (e.g., a Reply or Reply All email, among other possible options). In certain embodiments, the monitoring is performed by the response tracking plugin 108 embedded in the email received at 402. In other embodiments, the monitoring can be performed by a different module or component.

In certain embodiments, method 400 may only perform 404 (and subsequent steps) for an email that is currently "in focus" (or otherwise selected, open, etc.) in the user's email application 104, which can prevent a user from being flooded with notifications for conversation(s) (e.g., email threads) that the user may not be currently interested in. In certain embodiments, method 400 may only perform 404 (and subsequent steps) once a recipient has opened a responsive email (e.g., a Reply or Reply All email, among other possibilities), which is another way to prevent a user from being flooded with notifications for conversation(s) (e.g., email threads) that the user may not be currently interested in. In other embodiments, method 400 can perform 404 for all emails (in the user's email application 104) that have the necessary response tracking plugin 108 (or other module or component configured to perform one or more steps of the functionality described herein) and have not been deleted or sent to a "trash" folder, "SPAM" folder, or similar folder. In still other embodiments, method 400 can perform 404 for all emails (in the user's email application 104) that have the necessary response tracking plugin 108 (or other module or component configured to perform one or more steps of the functionality described herein) and which were received within a certain timeframe (e.g., most recent 5 minutes, most recent 30 minutes, most recent hour, most recent day, and so forth), which timeframe is configurable itself. The options described in this paragraph can be configured by an individual user, a manager of a group within a company, or a network administrator, among other possibilities.

At 406, method 400 determines whether a pulse has been received in connection with the email received in 402. If method 400 determines at 406 that a pulse has not (yet, or recently) been received in connection with the email received in 402, method 400 proceeds to 408 and determines if the email that was received in 402 is still active. Depending on the specific configurations in view at any given time, such as those configurations mentioned in the preceding paragraph, this determination can be based on determining whether the email received in 402 is still "in focus," whether a responsive email is currently opened on the client device 102 of the user that received the email in 402, whether the email received in 402 is newer than a prescribed timeout time limit, or simply whether the email remains in the user's email application without having been sent to a "trash" folder, "SPAM" folder, or similar folder, among other such options. If method 400 determines at 408 that the email received in 402 is still active (based on the user's current configurations for making such a determination), then method 400 returns to 404 and continues to monitor for the receipt of a pulse. If method 400 determines at 408 that the email received in 402 is not still active (based on the user's current configurations for making such a determination), then there is no further need to monitor that email for a pulse and method 400 ends.

If method 400 determines at 406 that a pulse (that has not already been accounted for) has been received in connection with the email received in 402, method 400 proceeds to 410 and determines whether the maximum number of indications for the email have already been displayed. For instance, a user may configure his or her system to only display the first n number of indications that are received for any given email, in order to avoid the user being overwhelmed with an excessive number of indications, popup notifications, bubbles, and so forth. In certain embodiments, this skip may either be skipped entirely, and/or configured so that no maximum number of indications exist (so that all indications are displayed, even if the number of indications displayed becomes large). In certain embodiments, such as the one shown in FIG. 4, if method 400 determines at 410 that the maximum number of indications for the email have already been displayed, then there is no further need to monitor for further pulses or display further indications, and method 400 ends. If method 400 determines at 410 that the maximum number of indications for the email have not already been displayed, and/or if 410 is skipped entirely in a given embodiment, method 400 proceeds to 412. (Although not expressly shown in FIG. 4, in certain embodiments method 400 can also determine, prior to performing 412, whether a user has elected to "suppress" or otherwise block notifications. If method 400 determines that a user has chosen to suppress or otherwise block notifications, method 400 can end at this point.)

At 412, method 400 displays an indication with information indicating that a user is responding. From the perspective of method 400, this information is displayed to the user who received the email in 402. In certain embodiments, the specific information displayed at this point is based on the parameters that were configured and determined in 204 (by the sender of the email that was received in 402), and/or parameters that were previously set by the user who received the email in 402, and/or by a network administrator, group manager, or other individual who set such relevant parameters. For instance, and depending on how the parameters were set, method 400 may display messages such as, e.g., "Bob Smith is responding," or "Two users are currently responding," or "Bob Smith and two other users are currently responding," or "A Senior Manager and two other users are currently responding," in addition to many other specific phrasings that can be used. In certain embodiments, this information can be displayed via a popup "notification" or "bubble." Particularly when popup notifications and/or bubbles are used to display such information, the system can be configured to only display a limited number of such popups, or to only display a new popup when material information has changed (such as, e.g., when a higher ranking user begins responding, but perhaps not to notify of a less important change such as going from three users responding to four users responding). In other embodiments, this information can be displayed in a manner other than a popup notification or bubble (which typically appear for a brief period of time, and then fade away from view on the screen), such as by a permanent monitor (such as, e.g., a JAVA APPLET, among many other such options) that remains on the sender's screen (rather than fading away) as long as method 400 is active for a particular email. In such an embodiment, the monitor component can provide unlimited real-time updates about which and how many users are responding without burdening the sender with the annoyance of repeated popup notifications and/or bubbles. (Updated information can also be provided in other embodiments as well, including, e.g., when popup notifications and/or bubbles are used, among other options.)

Because this is an interactive process that does not necessarily end after the first pulse (or other indication or relevant information) was received, after the relevant information is displayed in 412, method 400 can simultaneously perform two sets of actions in parallel (or substantially in parallel), as shown by FIG. 4:

In one set of actions, method 400 can return to 404 and continue monitoring for another pulse, such as, e.g., a pulse indicating that an additional user has begun responding, as well as an additional pulse indicating that a user who had previously begun responding is still actively responding. This thread is seen by the arrow protruding upwards from 412, and connecting back to 404.

In another set of actions, which can generally be seen by the arrow extending downwards from 412, method 400 can perform 414 through 420 in order to determine if the information in the indication that was displayed in 412 has gone stale for any reason, in which case the indication may have to be updated to reflect the fact that this particular user is no longer responding. For instance, at 414, method 400 determines whether a timeout has occurred, e.g., whether a sufficient amount of time has elapsed without receiving any further indication that the user who generated the pulse (that was received in 406) is still actively responding, in which case the method can assume that this user is no longer actively replying, and that the indication that was displayed in 412 has to be updated accordingly (or that this information has to be reflected in a subsequent indication). At 416, method 400 determines whether the reply (for which the pulse was received in 406) has been sent, i.e., the user who generated the pulse is no longer actively responding because s/he has completed and sent his/her response, in which case the indication that was displayed in 412 also has to be updated accordingly (or that this information has to be reflected in a subsequent indication).

If either 414 and/or 416 evaluate in the affirmative, method 400 proceeds to 418 and updates the indication that was issued in 412 (or issues a new update that reflects the updated information, or alternatively, stores the information for use in a subsequent update that is issued at a future time). For instance, method 400 can remove the name of the user who stopped responding if his or her name was previously listed in the indication, and/or decrease the count of the number of users that are actively responding, among other such examples. Method 400 then proceeds back to 404, and continues to monitor for a further pulse (or other indications or relevant information) to be received (either from the same user or client device 102 from which the most recent pulse was received in 406, or from a different user or client device 102).

If both 414 and 416 evaluate in the negative, method 400 proceeds to 420 and determines if the email that was received in 402 is still active. This steps follows the same basic logic as 408, which was discussed above and will not be repeated in detail here. If 420 determines that the email that was received in 402 is not still active (i.e., if 420 evaluates in the negative), method 400 ends. If 420 determines that the email that was received in 402 is still active (i.e., if 420 evaluates in the affirmative), method 400 (and/or the thread, subthread, process, subprocess, etc., that is performing steps 414, 416, 418, and 420) returns to 414 and continues to loop through 414, 416, and 420 until either 414 and/or 416 evaluate in the negative (in which case the method proceeds to 418 and then back to 404); or until 414, 416, and 420 all evaluate in the negative, in which case method 400 ends.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIG. 1A and FIG. 1B. In the flow diagram of FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 500 is described with reference to FIG. 1A and FIG. 1B as described above, although other models, frameworks, systems and environments may be used to implement these processes.

To provide more detail, FIG. 5 is a flowchart of a process 500 that includes various actions that can be performed to monitor for pulses related to emails that have already been sent, to store certain information about such emails and pulses when necessary, and to distribute information about such pulses to other recipients of the email being responded to. In certain embodiments, FIG. 5 and method 500 can be understood from the perspective of an enterprise email server (such as, e.g., server 114) or other email server or server in general, and/or from an SMTP layer of a network. The process 500 may be performed by an enterprise email server (such as, e.g., server 114) or other email server or server in general, or a component thereof (such as, e.g., Monitoring and Communication Module 116), and process 500 may also be performed in conjunction with one or more steps of one or more other processes described herein, such as methods 200, 300, and 400.

In one embodiment, method 500 begins at 502, where method 500 receives an outgoing email (such as, e.g., an email that was sent by a client device 102, and which was sent in conjunction with one or more steps of method 200). When method 500 receives such an email, method 500 can perform various functions in connection therewith, not all of which are expressly discussed herein. However, for the sake of discussing the particulars of method 500, at 504 the method can read and store information pertaining to the email. This information can include, e.g., the sender, the recipient(s) (i.e., the recipient list), the subject, the date and time (which can take the form of a date-time stamp, for example), and/or a Unique ID or other form of identifying information that uniquely identifies this email from other emails that may have an identical subject line and even an identical send and recipient list. (For example, a company may repetitively send a "Weekly Announcements" email every Monday to the same recipient list, at least subject to any turnover among employees in the company. As another example, a manager may send a "Weekly Goals" email every Monday to his or her team, which would generally include the same recipient list from week to week. But in either of these examples, as well as in many other example situations, one week's email is not the same as another week's email, and as such those emails—and the responses thereto—should be treated as being part of the same thread or email "topic" or "subject," and so forth.) At 506, method 500 forwards the email to the recipients in the recipient list.

At 508, method 500 begins to monitor for a pulse (or another indication or relevant information) to be received from any of the recipients of this email. At 510, method 500 determines if a pulse has been received. If 510 determines that a pulse has been received, method 500 performs 512 and informs the appropriate users (out of all the possible users that may have email accounts that are serviced by the server and/or SMTP layer) that the pulse was received. For instance, in certain embodiments, method 500 can forward the pulse (and any information included therewith) to the sender and recipients of the email. In other embodiments, method 500 can communicate this information to the sender and recipients of the email in another manner. Although not expressly shown in FIG. 5, in certain embodiments method 500 can collect the information received in one or more pulses, and aggregate that information and then forward the information at certain time intervals (such as, e.g., every one second) in order to reduce network traffic. In other embodiments, method 500 can forward this information substantially as soon as the information is received. In other embodiments, the timing aspect of 510 and 512 can be configured in other manners. After performing 512, method 500 loops back to 508 and continues to monitor for any further pulses.

If 510 determines that a pulse has not been received, method 500 proceeds to 514 and determines if a timeout (or any other indication that method 500 can stop monitoring for a pulse or another indication or relevant information related to this particular email thread) has occurred (or otherwise been received). If 514 determines that a timeout (or another indication that method 500 can stop monitoring for a pulse or another indication or relevant information related to this particular email thread) has occurred (or otherwise been received), method 500 ends. If 514 determines that a timeout (or another indication that method 500 can stop monitoring for a pulse or another indication or relevant information related to this particular email thread) has not occurred (or otherwise been received), method 500 determines if there any other reason to "break" at 516. For instance, in certain embodiments, method 500 may break, e.g., if the server is powered down. If method 500 determines to break at 516, then method 500 ends. If method 500 fails to identify or otherwise determine any reason to break at 516, method 500 returns to 508 and continues to monitor for a pulse.

Figure 6:
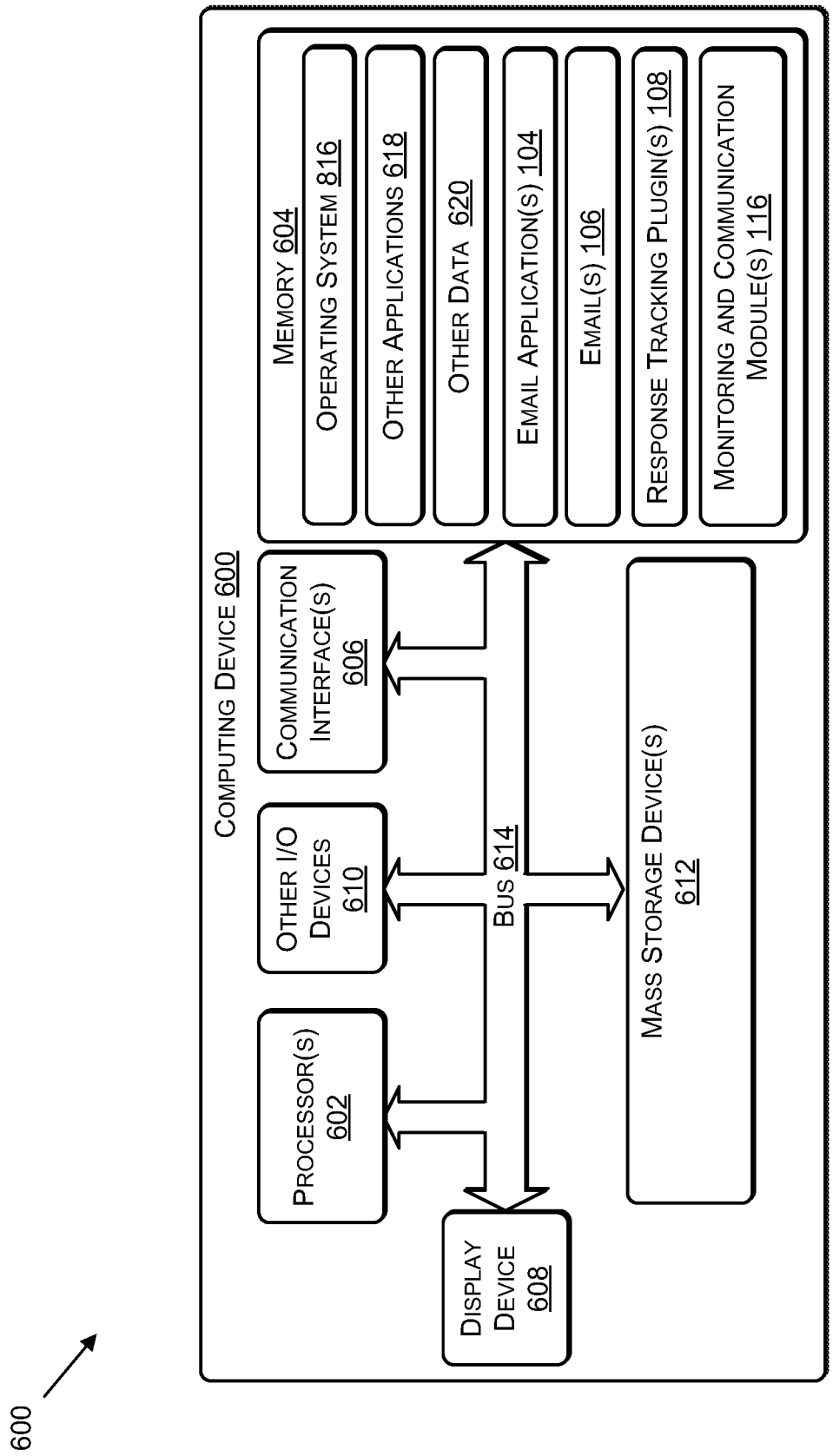
FIG. 6 illustrates an example configuration of a computing device that can be used to implement the systems and techniques described herein.

FIG. 6 illustrates an example configuration of a computing device 600 that can be used to implement the systems and techniques described herein, such as, for example, client devices 102, server 114, or another component illustrated in FIG. 1A and/or FIG. 1B. The computing device 600 may include one or more processors 602, a memory 604, communication interfaces 606, a display device 608, other input/output (I/O) devices 610, and one or more mass storage devices 612, configured to communicate with each other, such as via one or more system buses 614 or other suitable connection. While a single bus 614 is illustrated for ease of understanding, it should understood that the system bus 614 may include multiple buses, such as memory device buses, storage device buses, power buses, video signal buses, and the like.

The processor(s) 602 are one or more hardware devices that may include a single processing unit or a number of processing units, all of which may include single or multiple computing units or multiple cores. The processor(s) 602 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the processor(s) 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processor 602 to perform the various functions described herein. For example, memory 604 may include both volatile memory and non-volatile memory (e.g., random access memory (RAM), read-only memory (ROM), or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data via the network 110 with network connections 112. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like. A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store one or more email applications 104, one or more emails 106, one or more response tracking plugins 108, one or more Monitoring and Communication Modules 116, an operating system 616, other applications 618, and other data 620.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one embodiment," "this embodiment," "these embodiment," or "some embodiment," means that a particular feature, structure, or characteristic described is included in at least one embodiment, and the appearances of these phrases in various places in the specification are not necessarily all referring to the same embodiment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving an email comprising a plugin, wherein
the plugin is configured to enable response tracking, and
the email is received by a first recipient of a plurality of recipients of the email;
monitoring for a first pulse from a second recipient of the email, wherein
the pulse is configured to indicate that the second recipient of the email has begun a reply to the email,
the plurality of recipients comprises the second recipient; and
displaying an indication in response to receiving the first pulse, wherein
the indication comprises information about the second recipient of the email; and
prior to displaying the indication, determining whether a maximum number of indications has already been displayed with respect to the email.

2. The method of claim 1, further comprising:
updating the indication to indicate that the second recipient has stopped actively replying to the email, wherein
the updating is performed in response to detecting a timeout.

3. The method of claim 1, wherein
the displaying is performed further in response to determining that the maximum number of indications has not already been displayed with respect to the email.

4. The method of claim 1, further comprising:
updating the indication, wherein
the updating is performed in response to receiving a second pulse, wherein
the second pulse is configured to indicate that a third recipient of the email has begun a reply to the email, and
the plurality of recipients comprises the third recipient.

5. The method of claim 1, further comprising:
detecting that a responsive email has been opened by the first recipient, wherein the responsive email is responsive to the email; and
sending an outgoing pulse, wherein
the outgoing pulse is configured to indicate that the first recipient of the email has begun a reply to the email.

6. The method of claim 5, further comprising:
determining whether the first recipient of the email has stopped actively responding to the email; and
in response to determining that the first recipient of the email has stopped actively responding to the email, sending a second outgoing pulse, wherein
the second outgoing pulse is configured to indicate that the first recipient of the email has stopped actively replying to the email.

7. A computing device comprising:
one or more processors; and
one or more non-transitory computer-readable storage media to store instructions executable by the one or more processors to perform operations comprising:
receiving an email comprising a plugin, wherein
the plugin is configured to enable response tracking, and
the email is received by a first recipient of a plurality of recipients of the email;
monitoring for a first pulse from a second recipient of the email, wherein
the pulse is configured to indicate that the second recipient of the email has begun a reply to the email,
the plurality of recipients comprises the second recipient; and
displaying an indication in response to receiving the first pulse, wherein
the indication comprises information about the second recipient of the email; and
prior to displaying the indication, determining whether a maximum number of indications has already been displayed with respect to the email.

8. The computing device of claim 7, wherein the operations further comprise:
detecting that a responsive email has been opened by the first recipient, wherein the responsive email is responsive to the email; and
sending an outgoing pulse, wherein
the outgoing pulse is configured to indicate that the first recipient of the email has begun a reply to the email.

9. The computing device of claim 8, wherein the operations further comprise:
determining whether the first recipient of the email has stopped actively responding to the email; and
in response to determining that the first recipient of the email has stopped actively responding to the email, sending a second outgoing pulse, wherein
the second outgoing pulse is configured to indicate that the first recipient of the email has stopped actively replying to the email.

10. The computing device of claim 7, wherein
the displaying is performed further in response to determining that the maximum number of indications has not already been displayed with respect to the email.

11. The computing device of claim 7, wherein the operations further comprise:
updating the indication, wherein
the updating is performed in response to receiving a second pulse, wherein
the second pulse is configured to indicate that a third recipient of the email has begun a reply to the email, and
the plurality of recipients comprises the third recipient.

12. The computing device of claim 7, wherein the operations further comprise:
updating the indication to indicate that the second recipient has stopped actively replying to the email, wherein
the updating is performed in response to detecting a timeout.

13. One or more non-transitory computer-readable storage media to store instructions executable by one or more processors to perform operations comprising:
receiving an email comprising a plugin, wherein
the plugin is configured to enable response tracking, and
the email is received by a first recipient of a plurality of recipients of the email;
monitoring for a first pulse from a second recipient of the email, wherein
the pulse is configured to indicate that the second recipient of the email has begun a reply to the email,
the plurality of recipients comprises the second recipient; and
displaying an indication in response to receiving the first pulse, wherein
the indication comprises information about the second recipient of the email; and
prior to displaying the indication, determining whether a maximum number of indications has already been displayed with respect to the email.

14. The one or more non-transitory computer-readable storage media of claim 13, wherein the operations further comprise:
detecting that a responsive email has been opened by the first recipient, wherein the responsive email is responsive to the email; and
sending an outgoing pulse, wherein
the outgoing pulse is configured to indicate that the first recipient of the email has begun a reply to the email.

15. The one or more non-transitory computer-readable storage media of claim 14, wherein the operations further comprise:
determining whether the first recipient of the email has stopped actively responding to the email; and
in response to determining that the first recipient of the email has stopped actively responding to the email, sending a second outgoing pulse, wherein
the second outgoing pulse is configured to indicate that the first recipient of the email has stopped actively replying to the email.

16. The one or more non-transitory computer-readable storage media of claim 13, wherein
the displaying is performed further in response to determining that the maximum number of indications has not already been displayed with respect to the email.

17. The one or more non-transitory computer-readable storage media of claim 13, wherein the operations further comprise:
updating the indication, wherein
the updating is performed in response to receiving a second pulse, wherein
the second pulse is configured to indicate that a third recipient of the email has begun a reply to the email, and
the plurality of recipients comprises the third recipient.

18. The one or more non-transitory computer-readable storage media of claim 13, wherein the operations further comprise:
updating the indication to indicate that the second recipient has stopped actively replying to the email, wherein
the updating is performed in response to detecting a timeout.

* * * * *